United States Patent

Gopinath et al.

[11] Patent Number: 5,847,865
[45] Date of Patent: Dec. 8, 1998

[54] WAVEGUIDE OPTICAL AMPLIFIER

[75] Inventors: Anand Gopinath, Wayzata; Klein L. Johnson, St. Paul; Carol M. Ford, Columbia Heights; Randy J. Ramberg, Roseville, all of Minn.

[73] Assignees: Regents of the University of Minnesota; Honeywell, Inc., both of Minneapolis, Minn.

[21] Appl. No.: 801,575

[22] Filed: Feb. 18, 1997

[51] Int. Cl.$^6$ ................................ G02B 6/26; H01S 3/00
[52] U.S. Cl. .................................. 359/343; 372/7; 372/94
[58] Field of Search .................. 359/343; 385/30.131, 385/141; 372/7, 94; 501/101, 105

[56] References Cited

U.S. PATENT DOCUMENTS

| | | | |
|---|---|---|---|
| 4,938,594 | 7/1990 | Pavlath | 356/350 |
| 5,006,203 | 4/1991 | Purdes | 156/646 |
| 5,303,319 | 4/1994 | Ford et al. | 385/131 |
| 5,319,727 | 6/1994 | Ford et al. | 385/30 |
| 5,327,282 | 7/1994 | Takeda et al. | 359/341 |
| 5,418,182 | 5/1995 | Ford | 372/46 |
| 5,438,639 | 8/1995 | Ford et al. | 385/131 |
| 5,453,872 | 9/1995 | Heidemann et al. | 359/341 |
| 5,475,528 | 12/1995 | LaBorde | 359/341 |
| 5,491,767 | 2/1996 | McPherson et al. | 385/123 |
| 5,500,764 | 3/1996 | Armitage et al. | 359/341 |
| 5,532,870 | 7/1996 | Shigematsu et al. | 359/341 |
| 5,537,505 | 7/1996 | Borrelli et al. | 372/40 |
| 5,543,237 | 8/1996 | Watanabe | 428/691 |
| 5,545,595 | 8/1996 | Wang et al. | 501/3 |
| 5,559,912 | 9/1996 | Agahi et al. | 385/42 |
| 5,570,448 | 10/1996 | Imoto et al. | 385/126 |
| 5,579,154 | 11/1996 | Mueller-Fiedler et al. | 359/341 |
| 5,581,397 | 12/1996 | Maki et al. | 359/341 |

OTHER PUBLICATIONS

Kunz et al., Journal of Luminescence, vol. 37, #3, Jun. 1988, pp. 123–131; Abst. Only Herewith.

Jobevse et al, Proc. 1997. Conf. Opt. Fiber Comm. Feb. 1997, pp. 211–212; Abst. Only Herewith.

Reisfeld et al, Jour. of Solid State Chem., vol. 48, #3, pp. 323–332, Jul. 15, 1983; Abst. Only.

Baubon et al, Proc. of 1996 3rd French–Israeli Workshop on Apatites, vol. 8, #1–2, Nov. 25, 1996; Abst. Only.

*Primary Examiner*—Nelson Moskowitz
*Attorney, Agent, or Firm*—Westman, Champlin & Kelly, P.A.

[57] ABSTRACT

A waveguide optical amplifier include a substrate and a guiding or active layer. The substrate has a substrate surface and a substrate index of refraction. The guiding layer is of Zirconium dioxide ($ZrO_2$) and/or Alumina ($Al_2O_3$) and is carried on a cladding layer over the substrate surface. The guiding layer has a guiding layer index of refraction which is higher than the cladding index of refraction. The Zirconium dioxide guiding layer is doped with rare earth materials.

12 Claims, 3 Drawing Sheets

WAVEGUIDE OPTICAL AMPLIFIER

BACKGROUND OF THE INVENTION

The present invention relates to optical waveguides for carrying optical signals. More specifically, the invention relates to solid state optical waveguides which provide amplification to optical signals carried therein.

Optical waveguides are known in the art and are used to carry optical signals along a desired path. One type of optical waveguide includes a thin film of material deposited upon a substrate. The material has shape and optical characteristics to form a waveguide path along the substrate. Some types of optical waveguides may also provide amplification to the optical signals carried therein. In general, waveguide optical amplifiers are pumped with an external coherent light source (i.e., a laser) to cause ions to enter higher energy bands. Once in the higher energy band, the transition to a lower band is such that the optical signal passing therethrough is amplified.

Optical waveguides and optical waveguide amplifiers are becoming increasingly important as the communication industry struggles to meet ever-increasing bandwidth requirements. Such optical communication systems must provide a wide bandwidth and be capable of carrying signals over long distances. In particular, when transmitted over long distances the optical signal must be amplified, without significant bandwidth limitation or distortion.

Erbium (Er) doped fiber amplifiers have had a large impact on incoherent optical communication systems in the 1550 nm wavelength band. However, such amplifiers provide a relatively low gain per meter of fiber and therefore require a long fiber length to obtain sufficiently large amplification. Furthermore, in the 1300 nm wavelength band, the lasing transition of Praseodymium (Pr) ions $^1G_4 \to {}^3H_5$ have been found to be the most suitable for use in optical amplification. However, due to the high phonon energies in silica glass fibers, the probability of multiphonon damping is very high. Thus, Pr doped ZBLAN glass fiber, which is a ZrF based material having relatively low phonon energies, is currently the most common amplifier in use for the 1300 nm wavelength band. However, such a Pr doped fluoride glass fiber amplifier has a number of problems. First, the efficiency of the amplifier is relatively low and thus requires high power pump signals. Additionally, the fiber amplifier cannot be easily spliced to conventional silica fiber optical cabling. Finally, the material devitrifies, which results in degradation to the amplifier.

In general, affordable semiconductor amplifiers for either the 1300 nm wavelength band or the 1500 nm wavelength band have high spontaneous emission noise and therefore yield high noise figures. Most single mode optical fiber currently in place was designed to have very low dispersion at 1300 nm. Thus the need for a low cost, high performance and low noise optical amplifier is great, particularly at 1300 nm. This frequency band is used not only by long distance telephone companies but also by cable television companies. Various attempts have been made to provide such amplifiers. Erbium doped dielectric waveguides have been made in a variety of materials. LiNbO$_3$ has become the most prominent of these materials due to its properties. However, such amplifiers have a relatively low gain, only about 13 dB for a 70 mm structure. Thus, there is an ongoing need for a cost effective high performance optical amplifier which introduces little noise into the communication signal.

SUMMARY OF THE INVENTION

The present invention includes a waveguide optical amplifier deposited on a substrate. A guiding or active layer containing Zirconium dioxide (ZrO$_2$) or Alumina (Al$_2$O$_3$) is formed on the substrate. The guiding layer is doped with a rare earth material. In various embodiments, the rare earth dopant is Praseodymium (Pr), Erbium (Er), Neodymium (Nd), Ytterbium (Yb) or others, or combinations thereof. The guiding layer is, in some embodiments, co-deposited with silicon dioxide (SiO$_2$) and another material. Various embodiments of the optical amplifier in accordance with the invention include ridge guides stripes and buried ridges.

DETAILED DESCRIPTION OF THE PREFERRED EMBODIMENTS

Figure 1:
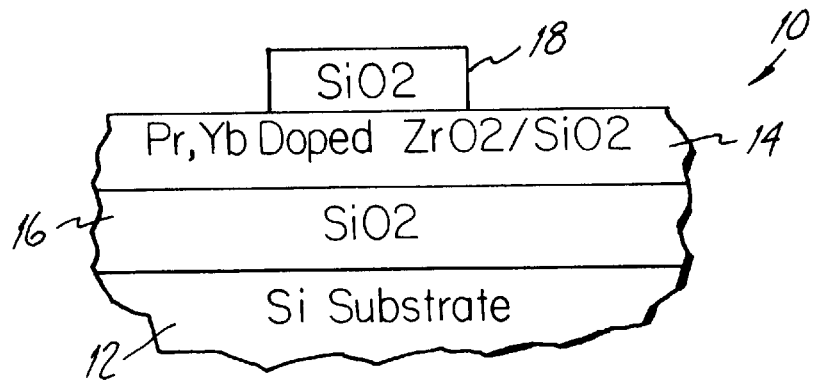
FIG. 1 is a cross-sectional view of an waveguide optical amplifier in accordance with one embodiment of the present invention.

FIG. 1 is a cross-sectional view of a waveguide optical amplifier 10 in accordance with one embodiment of the present invention. Waveguide optical amplifier 10 is shown deposited on a silicon (Si) substrate 12 and includes an amorphous Zirconium dioxide (ZrO$_2$) guiding or active layer 14. Zirconium dioxide guiding layer 14 is sandwiched between lower silicon dioxide (SiO$_2$) low refraction index layer 16 and upper silicon dioxide (SiO$_2$) low refraction index ridge layer 18. SiO$_2$ layer 16 is deposited upon Si substrate 12.

In accordance with the present invention, device 10 conducts light in a direction perpendicular to the plane of FIG. 1. The light conduction path is generally defined by, in the embodiment of FIG. 1, upper silicon dioxide ridge layer 18. As used herein, the term "light" and "optical" are intended to refer to frequencies which may be used with devices in accordance with the invention and includes frequencies outside of the visible light region. ZrO$_2$ guiding layer 14 provides amplification to the optical signal when pumped with an appropriate source.

In one embodiment, guiding layer 14 includes ZrO$_2$ which is co-deposited with SiO$_2$ and doped with Praseodymium (Pr), Neodymium (Nd) or Praseodymium-Ytterbium (Pr-Yb) for use at wavelengths in the 1300 nm range. In another embodiment, guiding layer 14 includes ZrO$_2$ co-deposited with SiO$_2$ and doped with Erbium (Er) or Erbium-Ytterbium (Er-Yb) for use with wavelengths in the 1550 nm range. In yet another embodiment, guiding layer 14 includes Alumina (Al$_2$O$_3$) co-deposited with SiO$_2$ and/or ZiO$_2$ and doped with Praseodymium and/or co-doped with Ytterbium for use in the 1300 nm band or doped with Erbium and/or co-doped with Ytterbium for use in the 1550 nm band.

For use at 1550 nm, device 10 is preferably pumped with a 980 nm or 1490 nm source. Further, for devices operating at 1300 nm band, pumping should be 980 nm and 1017 nm. The doping of guiding layer 14 with rare earth materials provides the desired amplification to the waveguide when properly pumped.

In operation, the distribution of the rare earth material is such that the corresponding ions are maintained at higher energy levels. The optical pumping induces the rare earth ions to transition from a lower energy level to a higher energy level. Subsequently, the passage of a second stimulating beam or optical signal, (i.e. the communication signal carried through device 10) causes ions to drop to lower energy levels thereby resulting the stimulated emission of phonons. The phonons are added to the optical signal carried in device 10, thus causing amplification. For efficient operation, the pumping signal must be of an appropriate wavelength and energy level to cause atoms of the rare earth material to be pumped to higher energy levels.

In the embodiment of FIG. 1, layer 16 has a thickness of 3.0 $\mu$m, layer 14 has a thickness of 0.6 $\mu$m, layer 18 has a thickness of 1.0 $\mu$m and layer 18 has a width of 5.0 $\mu$m. The guiding layer 14 is preferably deposited by sputtering which allows high concentrations of rare earth materials to be included in the layer. In this optical wave single mode propagation of the optical signal is ensured by design, whereas the pump wavelength may either be single mode or multimode, designed to ensure maximum performance efficiency.

In the preferred embodiment of the present invention, the guiding layer is deposited using sputtering techniques, and preferably ion beam sputtering techniques such as those described in Ford et al. U.S. Pat. Nos. 5,303,319, 5,319,727, 5,418,182 and 5,438,639. Preferably, the concentration of rare earth materials is as great as possible without excessive clustering which causes signal loss. Furthermore, the rare earth dopant is introduced during the sputtering deposition process to a suitable level to provide the desired amplification without clustering. The same sputtering techniques can be used to deposit both active and passive guiding layers on the same substrate. For example, clustering has occurred when Er is co-doped with Yb even as high as 0.5% using this technique.

Figure 2:
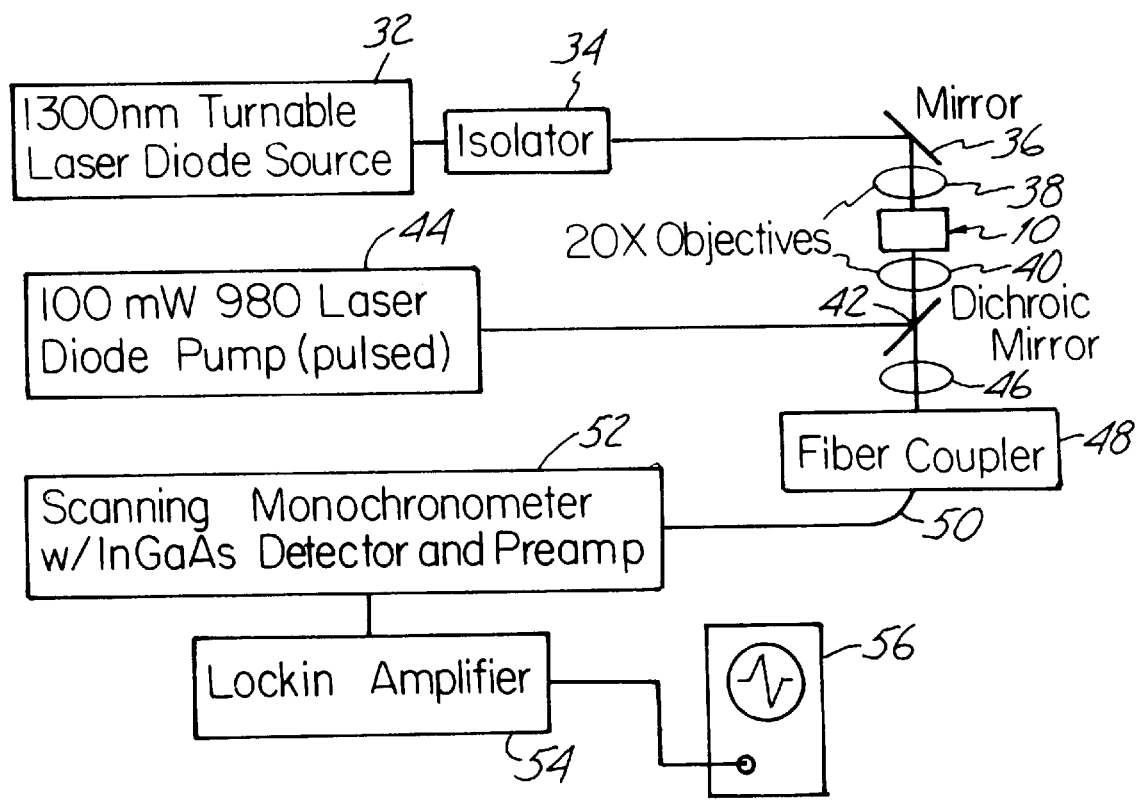
FIG. 2 is a simplified block diagram showing test apparatus used to characterize a waveguide optical amplifier.

FIG. 2 is a simplified diagram showing an apparatus 30 for testing a device 10 in accordance with the invention. Apparatus 30 includes a laser diode 32, isolator 34, mirror 36, 20X objectives 38 and 40, dichroic mirror 42, laser pump 44, objective 46, fiber coupler 48, fiber 50, monochronometer 52, lock-in amplifier 54 and oscilloscope 56. Laser diode 32 provides a test source signal at about 1300 nm and is tunable. Laser diode source 32 is isolated from the system by isolator 32. Its signal is reflected by mirror 36 through 20X objective 38 toward optical amplifier 10. Similarly, the output from optical amplifier 10 is directed through 20× objective 40 toward dichroic mirror 42 through objective 46 to fiber coupler 48. The signal is filtered by monochronometer 52 and detected and selected by lock-in amplifier 54 for display on oscilloscope 56 or other test device.

In FIG. 2, the optical pumping signal from pump 44 is directed toward optical amplifier 10 through dichroic mirror 42. However, those skilled in the art will recognize that other configurations may be used such as depositing the laser pump on the same substrate as the inventive optical amplifier.

Figure 3:
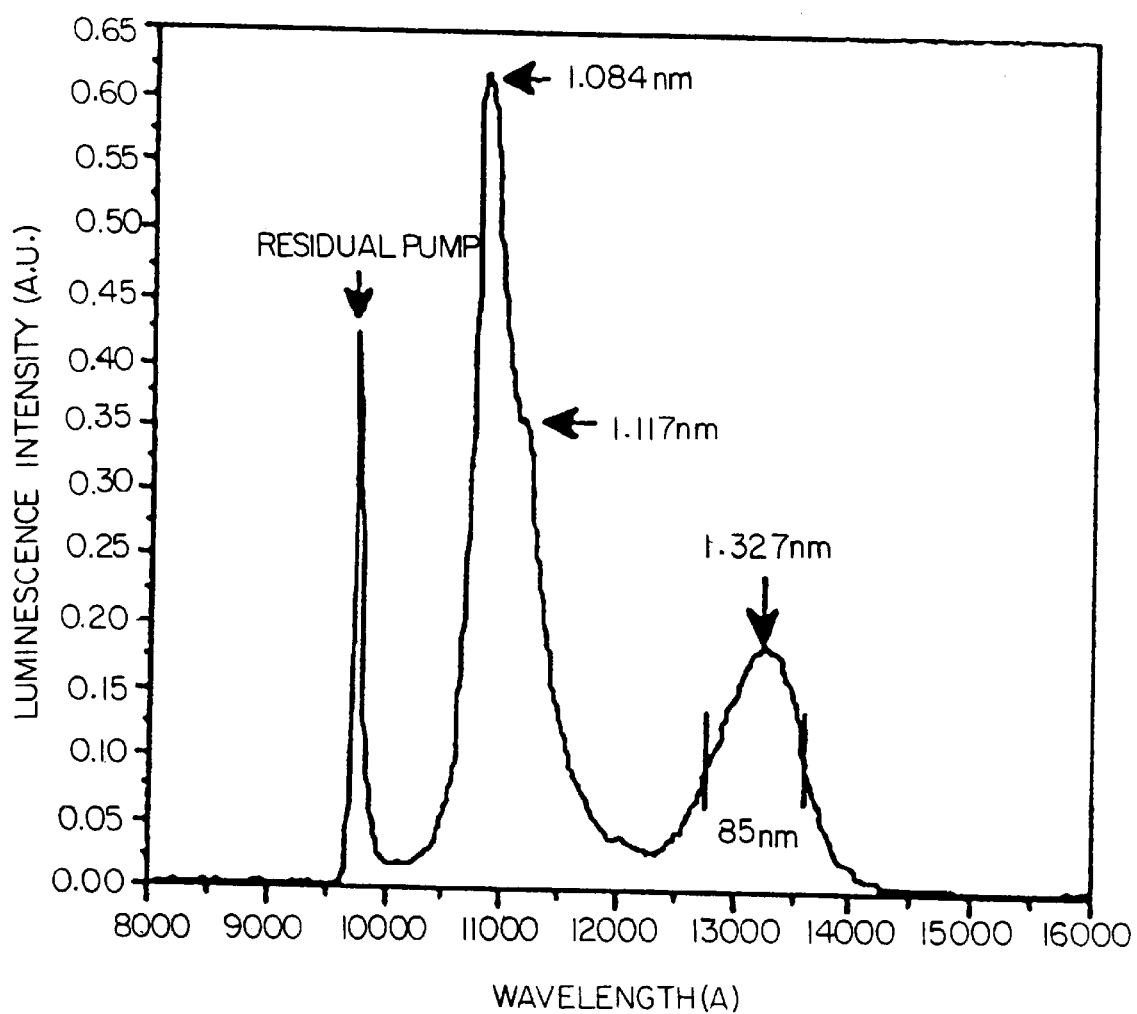
FIG. 3 is a graph of gain versus wavelength for a waveguide optical amplifier in accordance with the invention.

FIG. 3 is a graph of gain versus wavelength for optical amplifier 10 generated using test apparatus 30. Laser diode source 32 was swept through about 1290 nm and 1325 nm in wavelength while the gain of the output signal was observed on oscilloscope 56 and recorded. The particular device tested had a length of 6 mm and was pumped with, approximately a 30 mW signal. The particular structure was $ZrO_2$—$SiO_2$ guide layer (n=2.12) with $SiO_2$ (n=1.49) above and below this layer, the top layer etched into a ridge, the guide layer was doped with 0.5% Pr and 1% Yb. The substrate used was silicon. The $SiO_2$ layer had a thickness of 3 $\mu$m, the active layer was sputtered to a thickness of 0.6 $\mu$m. The top $SiO_2$ layer was deposited to 0.15 $\mu$m and etched to form a 5.0 $\mu$m wide stripe with $CF_4$ reactive ion etching through a 75 nm Cr mask. The Yb co-dopant acts to extend the pump wavelength to the 980 nm band of typical high power single-mode strained quantum well InGaAs semiconductor layers. The channel waveguides were endfire pumped with a 100 mW 975 nm laser diode through a 20× microscope objective, and the emitted light was collected at the far end with a multi-mode fiber and coupled through a dichroic mirror into a 1 meter scanning monochrometer with a room temperature InGaAs detector and locking amplifier, as shown in FIG. 2. Due to the poor quality of the as-cleaved facets of the waveguides only about 15 mW was actually launched into the 5.0 micron wide guides.

The observed luminescence spectra shown in FIG. 3 includes peaks in addition to the residual pump signal, centered at 1084, 1117, and 1327 nm. The strong $^1G_4$—$^3H_5$ transition at 1327 nm evidences phonon quenching is not a dominant factor in this material. The 85 nm luminescence bandwidth of the $^1G_4$—$^3H_5$ emission line is larger than that observed for the chalcogenide glasses. Amplification was also observed by coupling a signal from an external cavity tunable diode laser into one facet of a 0.6 cm long device, while backward pumping the sample with the 975 nm laser diode. Amplification of more than 1.3 dB/cm internal gain at $\lambda$=1304 nm was observed. This gain is considered significant considering the low level of pump power used. Amplification may be improved through polishing and anti-reflective coating the facets.

Figure 4:
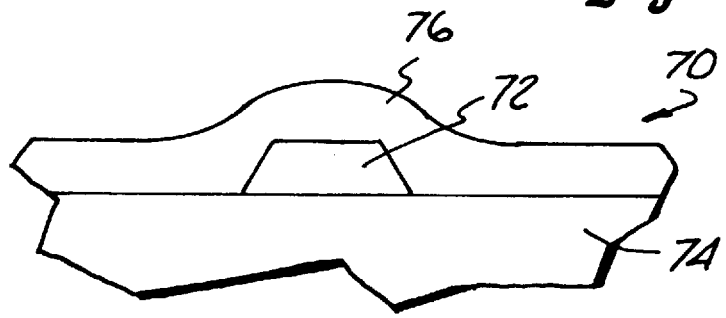
FIG. 4 is a cross-sectional view of a waveguide optical amplifier in accordance with another embodiment.

FIG. 4 is a cross-sectional view of another embodiment of an optical amplifier 70 in accordance with the invention. Amplifier 70 includes a guiding or active layer 72 of the aforementioned materials deposited on a substrate 74 such as Si or glass. An encapsulation layer 76 of $SiO_2$ is deposited across the surface thereby covering guide layer 72.

Figure 5:
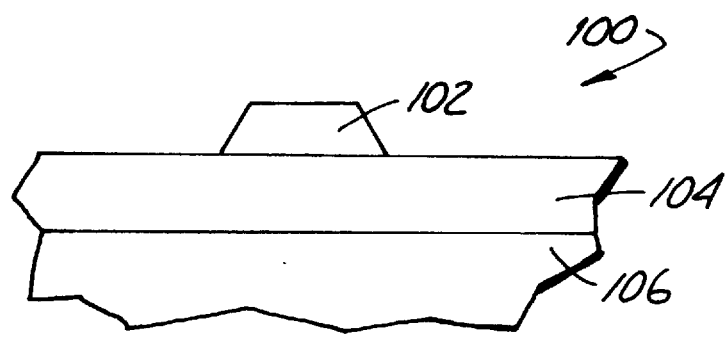
FIG. 5 is a cross-sectional view of a waveguide optical amplifier in accordance with another embodiment.

FIG. 5 is a cross-sectional view of a waveguide optical amplifier 100 in accordance with another embodiment. Amplifier 100 includes guide or active layer 102 comprising the aforementioned materials deposited on a layer of $SiO_2$ 104 over substrate 106 which typically comprises Si or glass.

In the embodiments of FIGS. 4 and 5, the active layer must be etched to form an elongated shape. The etching process should be such that the sides of the layer are not damaged which can lead to scattering and signal loss. Preferably the active layer is etched using a wet etching process, which uses photolithograph mask and suitable acid etchant.

Figure 6:
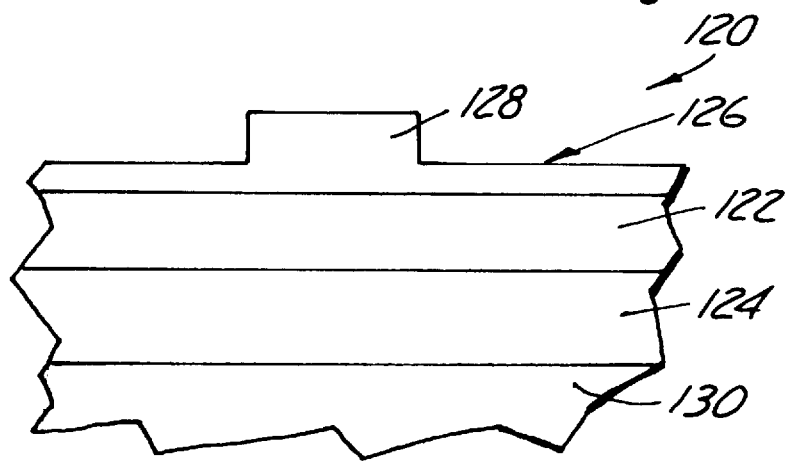
FIG. 6 is a cross-sectional view of a waveguide optical amplifier in accordance with another embodiment.

FIG. 6 is cross-sectional view of another embodiment of a waveguide optical amplifier 120 in accordance with the present invention. Optical amplifier 120 includes active layer 122 deposited on base layer 124 and covered by top layer 126. A ridge 128 is formed in top layer 126. Amplifier 120 is carried on substrate 130. The various layers of device 120 are of materials in accordance with the present invention. For example, layer 120 my be $ZrO_2$/$SiO_2$, layer 124 of $SiO_2$, layer 126 of $SiO_2$ and substrate 130 of Si or other substrate material. In the embodiment of FIG. 6, the active layer 122 is amorphous and does not require etching. Further, when ridge 128 is formed a portion of layer 126 is not etched whereby layer 122 is covered.

The present invention includes formation of a waveguide optical amplifier having an active or guiding layer of $ZrO_2$ co-deposited with $SiO_2$, $Al_2O_3$ co-deposited with $SiO_2$ or $ZrO_2$, $Al_2O_3$ and $SiO_2$ all co-deposited together. The guide layer is sandwiched between layers having a lower index of refraction. Preferably, the dimensions are selected such that wave propagates in a single mode, preferably the TE mode, along the length of the structure. Further, the dimensions can be selected such that the waveguide is polarization insensitive and the optical modes at the ends of the amplifier match the optical modes of the fiber optic cable to which it is attached.

Although the present invention has been described with reference to preferred embodiments, workers skilled in the art will recognize that changes may be made in form and detail without departing from the spirit and scope of the invention. In one preferred embodiment, the guiding (active) layer is an amorphous layer (see FIGS. 1 and 6) which does not require etching which can damage surfaces of the layer and lead to signal loss through scattering near. In embodiments where the active layer is etched (FIGS. 4 and 5), such etching is preferably through wet etching (i.e., a chemical etch) which tends to cause little damage to the etched surfaces.

What is claimed is:

1. A waveguide optical amplifier, comprising:

a substrate having a substrate surface and a substrate index of refraction;

an amorphous, unetched active layer containing Zirconium dioxide ($ZrO_2$) and doped with a rare earth material deposited on the substrate surface having an active layer index of refraction, wherein the active layer index of refraction is higher than the substrate index of refraction; and a low index of refraction ridge deposited on the active layer and patterned to thereby define an elongated region of optical confinement in the underlying amorphous active layer in a direction perpendicular to a direction of propagation.

2. The waveguide optical amplifier of claim 1 wherein the rare earth dopant comprises Erbium (Er).

3. The waveguide optical amplifier of claim 1 wherein the rare earth dopant comprises Praseodymium (Pr).

4. The waveguide optical amplifier of claim 1 wherein the rare earth dopant comprises Neodymium.

5. The waveguide optical amplifier of claim 1 including a co-dopant in the amorphous active layer.

6. The waveguide optical amplifier of claim 5 wherein the co-dopant comprises Ytterbium (Yb).

7. The waveguide optical amplifier of claim 1 wherein the substrate comprises silicon (Si).

8. The waveguide optical amplifier of claim 1 including an optical pump providing a pump output signal between about 980 nm and about 1490 nm in wavelength.

9. The waveguide optical amplifier of claim 1 wherein the amorphous active layer is Pr—Yb doped and provides amplification to signals between about 1280 nm and about 1360 nm.

10. The waveguide optical amplifier of claim 1 including $SiO_2$ co-deposited in the amorphous active layer with the $ZrO_2$.

11. The waveguide optical amplifier of claim 1 including $Al_2O_3$ co-deposited in the amorphous active layer with the $ZrO_2$.

12. The waveguide optical amplifier of claim 1 including a cladding layer adjacent the amorphous active layer having an index of refraction which is less than the active layer index of refraction.

* * * * *